(12) United States Patent
Sato (10) Patent No.: US 6,413,894 B1
(45) Date of Patent: *Jul. 2, 2002

(54) OPTICAL GLASS AND OPTICAL PRODUCT

(75) Inventor: Kouichi Sato, Tokyo (JP)

(73) Assignee: Hoya Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,618

(22) Filed: Apr. 27, 1999

(30) Foreign Application Priority Data

Apr. 30, 1998 (JP) .......................................... 10-120161

(51) Int. Cl.⁷ ......................... C03C 3/064; C03C 3/066; C03C 3/068
(52) U.S. Cl. .............................. 501/77; 501/78; 501/79; 501/900; 501/903; 428/542.8
(58) Field of Search .............................. 501/77, 78, 79, 501/900, 903; 428/542.8

(56) References Cited

U.S. PATENT DOCUMENTS

| | | | | |
|---|---|---|---|---|
| 4,055,435 A | * | 10/1977 | Sagara | 501/77 |
| 4,084,978 A | * | 4/1978 | Sagara | 501/73 |
| 4,213,787 A | * | 7/1980 | Faulstich et al. | 501/77 |
| 4,390,638 A | * | 6/1983 | Mennemann et al. | 501/77 |
| 4,447,550 A | * | 5/1984 | Leroy et al. | |
| 4,742,028 A | * | 5/1988 | Boudot et al. | 501/78 |
| 4,897,101 A | * | 1/1990 | Carpenter et al. | |
| 5,952,256 A | * | 9/1999 | Morishita et al. | 501/79 |

FOREIGN PATENT DOCUMENTS

| | | | | |
|---|---|---|---|---|
| GB | 2 103 201 | * | 2/1983 | ................. 501/77 |
| GB | 2 265 367 | * | 9/1993 | |
| JP | 53-016718 | * | 2/1978 | |
| JP | 59-050048 | * | 3/1984 | |
| JP | 61-146730 | | 7/1986 | |
| JP | 61-232243 | | 10/1986 | |
| JP | 62-100449 | * | 5/1987 | |
| JP | 1-148726 | * | 6/1989 | |
| JP | 9-071435 | * | 3/1997 | |

OTHER PUBLICATIONS

Japanese Industrial Standard Glossary of Optical Terms JIS Z 8120 1986.

* cited by examiner

Primary Examiner—David Sample
(74) Attorney, Agent, or Firm—Nixon & Vanderhye (57) ABSTRACT

When a glass melt of an optical glass having a refractive index ($n_d$) of at least 1.7 and an Abbe number ($v_d$) of 28 to 41 is flowed down from a flow pipe made of Pt or a Pt alloy to form glass gobs continuously, there is caused a problem that the glass gobs have striae or that the weight variability among the glass gobs is large, and the problem can be overcome by the use of an optical glass comprising silicon oxide and boron oxide, the ratio of a content of the silicon oxide to a content of the boron oxide being greater than 0.78, the optical glass having a contact angle of at least 40° to Pt or a Pt alloy at a predetermined temperature equivalent to, or higher than, its liquidus temperature or in a predetermined temperature range whose lower limit is equivalent to, or higher than, the liquidus temperature and having a sag temperature $T_s$ of 580° C. or lower.

8 Claims, 2 Drawing Sheets

OPTICAL GLASS AND OPTICAL PRODUCT

FIELD OF THE INVENTION

The present invention relates to an optical glass, a shapeable material formed of the above optical glass, a process for the production of the shapeable material, an optical product formed from the above optical glass as a raw material and a process for the production of the above optical product. It particularly relates to a high-dispersion or intermediate-dispersion optical glass having high refractive index, a precision-press shapeable material formed of the above optical glass, a process for the production of the shapeable material, an optical product formed from the above optical glass as a raw material and a process for the production of the above optical product.

TECHNICAL BACKGROUND

For forming a desired optical system, generally, it is required to combine various optical elements having different refractive indices $n_d$ and Abbe numbers $v_d$. For this purpose, various optical glasses having different refractive indices $n_d$ and Abbe numbers $v_d$ have been developed.

For example, as a high-dispersion or intermediate-dispersion optical glass having refractive indices $n_d$ of approximately 1.7 or greater and Abbe numbers $v_d$ of approximately 28 to 41 (the above optical glass will be referred to as "a high-refractivity high-dispersion or intermediate-dispersion optical glass" or "high-refractivity high- or intermediate-dispersion optical glass" hereinafter), various glasses classified into dense barium flint glass, dense flint glass, lanthanum flint glass, dense lanthanum flint glass or the like have bee developed (see JIS Z8120).

Meanwhile, precision-press molding is widely used as a method of forming optical products such as optical elements (a lens, a prism or the like) and optical fiber fixing members from a glass. In precision-press molding for producing a shaped article of a glass, a precision-press shapeable material (glass preform) is shaped into a shaped article of glass having a form of an end product or a form close thereto, in a shaping mold having cavity of a predetermined form at a high temperature under a high pressure. Shaping surfaces of the shaping mold used for the precision-press shaping have a high surface accuracy. The above precision-press shapeable material (glass preform) is pressed in the above shaping mold when the above shaping mold and the precision-press shapeable material (glass preform) have temperatures in a predetermined temperature range, whereby the shape of each of the above shaping surfaces is transferred to the precision-press shapeable material (glass preform).

When a shaped article of a glass is produced by the precision-press shaping, it is required to shape a precision-press shapeable material under pressure at a high temperature as described above. The shaping mold used therefor is exposed to a high temperature, and a high pressure is exerted thereon. Concerning the precision-press shapeable material, therefore, (1) it is desired to decrease the sag temperature $T_s$ thereof to make it as low as possible for preventing the damage of the shaping mold per se and a release film provided on an internal surface of the shaping mold, which damage is caused by a high-temperature environment during the press shaping, (2) it is also desired to decrease the reactivity thereof with a shaping mold to make it as low as possible for preventing the downgrading of surface properties of a shaped article, which downgrading is caused by a reaction product formed by a reaction between the precision-press shapeable material and the shaping mold, and further, (3) it is desirable that the precision-press shapeable material contains no lead oxide (PbO) in view of environmental protection.

A high-refractivity high-dispersion or intermediate-dispersion optical glass which is preferred as a precision-press shapeable material in view of the above points (2) and (3) is a high-refractivity high-dispersion or intermediate-dispersion optical glass which contains no lead oxide as an essential component, such as an optical glass classified as lanthanum flint glass or dense lanthanum flint glass. A high-refractivity high- or intermediate-dispersion optical glass which contains lead oxide as an essential component, such as an optical glass classified as dense barium flint glass or dense flint glass, cannot be said to be preferred as the above precision-press shapeable material in view of the above points (2) and (3).

In general, the high-refractivity high- or intermediate-dispersion glass containing no lead oxide as an essential component is borate glass or borosilicate glass. As the above glass, there are known an optical glass of $B_2O_3$—$SiO_2$—$Li_2O$—$CaO$—$La_2O_3$—$TiO_2$—$ZrO_2$—$Nb_2O_5$ system disclosed in JP-A-61-232243 and an optical glass of $SiO_2$—$B_2O_3$—$Li_2O$—$La_2O_3$—$ZrO_2$—$Nb_2O_5$ system disclosed in JP-A-61-146730.

There are a variety of methods of forming press-shapeable material used for precision-press shaping, depending upon kinds of shaped articles as end products. In any method, however, it is required to prepare a desired glass melt in a melting furnace, introduce the glass melt to a desired site through a flow pipe and flow it down through a flow outlet of the flow pipe.

As a material for the above melting furnace or the flow pipe, generally, Pt (platinum) or a Pt alloy is used. A conventional high-refractivity high- or intermediate-dispersion optical glass containing no lead oxide as an essential component, i.e., a conventional high-refractivity high- or intermediate-dispersion optical glass formed of borate glass or borosilicate glass is easily wettable with the Pt or Pt alloy used as a material for the melting furnace or the flow pipe during the melting of the glass.

Figure 1:
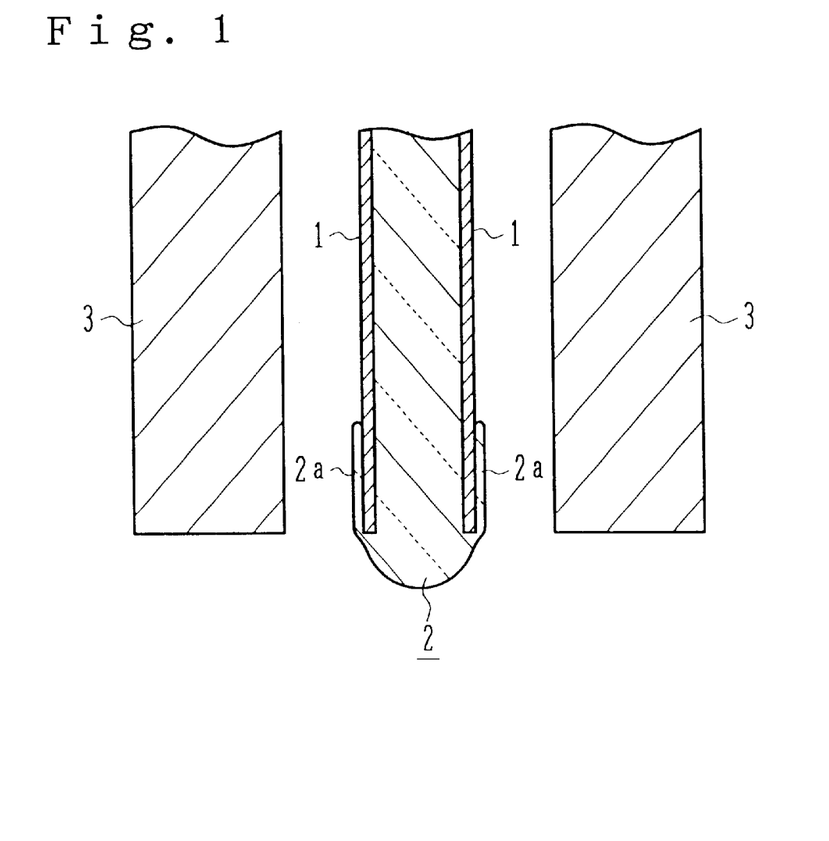
FIG. 1 is a cross-sectional view which schematically shows a phenomenon that "part of a glass melt wets back (flows back) along an external surface of an end portion of a flow pipe on its outlet side" when the glass melt is flowed down from the flow pipe made of Pt or a Pt alloy.

When a glass melt is easily wettable with a flow pipe formed of Pt or a Pt alloy, as shown in FIG. 1, there occurs a phenomenon that part $2a$ of glass melt $2$ flowing down from a flow pipe $1$ causes "wetting backward" (flows backward) along an external surface of an end portion of the flow pipe $1$ on its outlet side even if the flow pipe $1$ is disposed so as to direct the outlet downwardly (the above phenomenon will be referred to as "wet backward phenomenon" hereinafter). The wet backward phenomenon intensifies with a decrease in the diameter of the flow pipe $1$.

When it is attempted to produce a precision-press shapeable material for a small-sized optical product, e.g., a precision-press shapeable material for a small-diametered lens, the above flow pipe $1$ necessarily has a small diameter, so that the above conventional high-refractivity high- or intermediate-dispersion optical glass containing no lead oxide as an essential component comes to exhibit an intensified wet backward phenomenon when it is used for obtaining the above precision-press shapeable material for a small-sized optical product. When the above wet backward phenomenon intensifies, there are caused the following problems. (i) When a glass melt is flowed down through a flow pipe to obtain a glass gob, the glass gob has striae, and as a result, an optical product having desired optical properties can be no longer obtained from the glass gob. (ii) When a glass melt is flowed down through a flow pipe to obtain a glass gob, it is difficult to adjust the weight of the glass gob, and as a result, it is difficult to adjust the weight of an optical product to be obtained from the glass gob, or there is required an step of adjusting the weight of the optical product. In FIG. 1, reference numeral 3 indicates a flowing furnace for heating the flow pipe 1.

SUMMARY OF THE INVENTION

It is a first object of the present invention to provide an optical glass which is almost free from the above wet backward phenomenon and which is a high-refractivity and high- or intermediate dispersion optical glass.

It is a second object of the present invention to provide a precision-press shapeable material which can easily give a small-sized precision-press shapeable material of a high-refractivity and a high- or intermediate dispersion optical glass, and a process for the production thereof.

It is a third object of the present invention to provide a optical product which can easily give a small-sized optical product formed of a high-refractivity and a high- or intermediate dispersion optical glass, and a process for the production thereof.

According to the present invention, the above first object of the present invention is achieved by an optical glass comprising silicon oxide and boron oxide and having a refractive index ($n_d$) of at least 1.7 and an Abbe number ($v_d$) of 28 to 41, the ratio of a content of the silicon oxide to a content of the boron oxide being greater than 0.78, the optical glass having a contact angle of at least 40° to Pt or a Pt alloy at a predetermined temperature equivalent to, or higher than, its liquidus temperature or in a predetermined temperature range whose lower limit is equivalent to, or higher than, the liquidus temperature and having a sag temperature $T_s$ of 580° C. or lower (the above optical glass will be referred to as "optical glass I" hereinafter).

According to the present invention, the above first object of the present invention is also achieved by another optical glass comprising silicon oxide, boron oxide, lithium oxide, calcium oxide, titanium oxide and niobium oxide, the total content of silicon oxide, boron oxide, lithium oxide, calcium oxide, titanium oxide and niobium oxide being at least 63% by weight, the content of the silicon oxide being 17 to 33% by weight (exclusive of 17% by weight and 33% by weight), the content of the boron oxide being 1 to 25% by weight, the content of the lithium oxide being 5 to 11% by weight, the content of the calcium oxide being 5 to 27% by weight (exclusive of 5% by weight), the content of the titanium oxide being 1 to 20% by weight, the content of the niobium oxide being 13 to 30% by weight (exclusive of 13% by weight), the total content of the silicon oxide and the boron oxide being 20 to 50% by weight, the ratio of the silicon oxide content to the boron oxide content being greater than 0.78, the optical glass further comprising 0 to 16% by weight, exclusive of 16% by weight, of lanthanum oxide, 0 to 12% by weight of zinc oxide, 0 to 15% by weight of barium oxide, 0 to 10% by weight of zirconium oxide, 0 to 10% by weight of strontium oxide, 0 to 6% by weight of tungsten oxide, 0 to 7% by weight of aluminum oxide, 0 to 5% by weight of sodium oxide, 0 to 5% by weight of potassium oxide, 0 to 5% by weight of yttrium oxide, 0 to 5% by weight of gadolinium oxide, 0 to 5% by weight of ytterbium oxide, 0 to 5% by weight of tantalum oxide, 0 to 2% by weight of arsenic oxide and 0 to 2% by weight of antimony oxide (the above optical glass will be referred to as "optical glass II" hereinafter).

According to the present invention, the above second object of the present invention is achieved by a precision-press shapeable material formed of the above optical glass of the present invention.

Further, the process for the production of the above precision-press shapeable material comprises dropping a glass melt for the above optical glass of the present invention from an outlet of a flow pipe made of Pt or a Pt alloy to form a glass gob and shaping the glass gob to obtain the precision-press shapeable material.

According to the present invention, the above third object of the present invention is achieved by an optical product formed of the above optical glass of the present invention.

Further, the process for the production of the above optical product comprises the steps of placing a precision-press shapeable material produced by the above process for the production of a precision-press shapeable material, provided by the present invention, in a shaping mold comprising at least an upper mold member and a lower mold member for forming a predetermined cavity form, and precision-press shaping the above precision-press shapeable material into a predetermined form with the above shaping mold while the precision-press shapeable material is a softened state under heat.

BEST MODES FOR PRACTICING THE INVENTION

Working embodiments of the present invention will be explained hereinafter.

The optical glass I of the present invention will be explained first.

As explained above, the optical glass I of the present invention comprises silicon oxide and boron oxide and has a refractive index ($n_d$) of at least 1.7 and an Abbe number ($v_d$) of 28 to 41. In the optical glass I, the ratio of the silicon oxide content to the boron oxide content is greater than 0.78, and the optical glass I has a contact angle of at least 40° to Pt or a Pt alloy at a predetermined temperature equivalent to, or higher than, its liquidus temperature or in a predetermined temperature range whose lower limit is equivalent to, or higher than, the liquidus temperature and has a sag temperature $T_s$ of 580° C. or lower.

The term "Pt alloy" used in the present specification refers to a Pt alloy which can be used as a material for a flow pipe for directing a molten glass (glass melt) from a melting furnace or a molten glass vessel to a predetermined site. Specifically, the "Pt alloy" includes an alloy of Pt and at least one member selected from the group consisting of Au (gold), Rh (rhodium), Ir (iridium) and Pd (palladium). Above all, a Pt alloy containing at least 80 at % of Pt and 20 at % or less of Au and containing 10 at % or less of total of Rh, Ir and Pd (including a case where the total of Rh, Ir and Pd is zero), or a 95Pt-5Au alloy in particular, is used as a material for the above flow pipe.

Further, the term "contact angle" used in the present specification refers to a degree of a contact angle of a glass to a plate made of Pt or a plate made of a Pt alloy, measured by the following method.

Figure 2A:
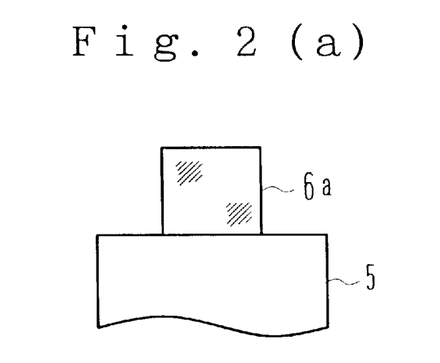
FIGS. 2(a) and 2(b) are side views for explaining a method of measuring a "contact angle" referred to in the present invention.
Figure 2B:
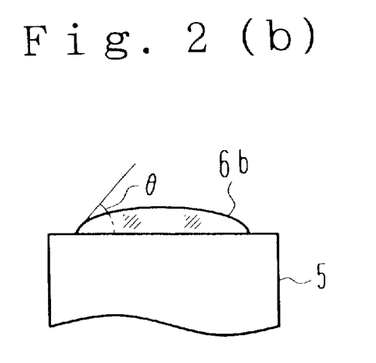

First, as shown in FIG. 2(a), a glass sample 6a having a size of 4×4×4 mm is placed on a central area of top surface of a horizontally maintained plate 5 made of Pt or a Pt alloy (specularly surface-polished plate having a size of 10×10 mm when viewed as a plan view, to be simply referred to as "plate 5" hereinafter). The glass sample 6a is heated to a predetermined temperature equivalent to, or higher than, its liquidus temperature (L.T.) in atmosphere, and maintained in this state for 30 minutes to be melted, and then the molten glass sample is annealed by maintaining the molten glass sample at a temperature equivalent to its glass transition point for 1 hour and then cooling it to room temperature at a temperature decrease rate of −30° C./hour. Then, as shown in FIG. 2(b), a solidified glass sample 6b is considered a liquid and measured for its contact angle θ to the above plate 5.

The specularly surface-polished plate made of Pt or a Pt alloy refers to a plate made of Pt or a Pt alloy which plate is processed to have a surface having an $R_z$ of 500 to 10,000 Å. With a decrease in the $R_z$ value, the variability of measurement results decreases. So long as the $R_z$ value is within the above range, for example, the surface may have an $R_z$ of 5,000 to 10,000 Å, or it may have an $R_z$ of 1,000 to 10,000.

The present inventor has found that, even when, e.g., a small-diametered flow pipe (which means a flow pipe having an inner diameter of 1 to 8 mm and used in this sense hereinafter) is used, the above "wet backward phenomenon" can be prevented by selecting a glass composition so as to have a contact angle of at least 40° at a temperature or in a temperature range during the flowing of a glass melt (molten glass) out of the flow pipe, i.e., at a predetermined temperature equivalent to, or higher than, the liquidus temperature of the glass or in a predetermined temperature range whose lower limit is equivalent to, or higher than, the liquidus temperature.

So long as the above condition of the contact angle of the glass is satisfied, a glass gob almost free of striae and a variability in weight can be easily produced even if a glass melt is flowed down from the above small-diametered flow pipe. As a result, a precision-press shapeable material (glass preform) for a small-sized optical product having desired optical properties and weight can be easily produced with high productivity, and an optical product such as a lens can be easily produced by shaping the above precision-press shapeable material with high productivity according to a press-forming method or other forming method. The above contact angle is preferably 40° to approximately 120°, more preferably approximately 50° to approximately 120°, still more preferably approximately 60° to approximately 120°.

Since the glass melt during the flowing through the flow pipe generally has a temperature in the range of from the liquidus temperature L.T. of the glass to [(L.T.) +40]° C., the temperature for heating the glass sample for determining the above contact angle (heating temperature for melting the glass sample) is preferably set at a temperature in the range of from the liquidus temperature L.T. of the glass sample to [(L.T.)+40]° C., more preferably at a temperature in the range of from [(L.T.)+10]° C. to [(L.T.)+20]° C.

Further, the present inventor has found that when silicon oxide and boron oxide are used as glass-forming components and when the ratio of the silicon oxide content to the boron oxide content is greater than 0.78, there can be easily obtained a high-refractivity high-dispersion or intermediate-dispersion optical glass which satisfies the above condition of the contact angle and has a refractive index ($n_d$) of at least 1.7 and an Abbe number ($v_d$) of 28 to 41 and which can have a sag temperature $T_s$ of 580° C. or lower.

The optical glass I of the present invention has been invented on the basis of the above two findings. The optical glass I therefore causes almost no wet backward phenomenon even when a glass melt thereof is flowed down from a small-diametered flow pipe made of Pt or a Pt alloy, and it is a high-refractivity high- or intermediate-dispersion optical glass. Further, since almost no wet backward phenomenon is caused when a glass melt thereof is flowed down from a small-diametered flow pipe made of Pt or a Pt alloy, the above wet backward phenomenon takes place in almost no case when a glass melt thereof is flowed down from a small-diametered flow pipe (inner diameter approximately 1 to 3 mm) made of Pt or a Pt alloy for obtaining a precision-press shapeable material having a diameter of 1 to 5 mm, so that the above precision-press shapeable material having a high weight accuracy can be easily obtained.

The optical glass I having the above advantages can be obtained as those having contact angles of at least 40°, a sag temperature of 580° C. or lower and different optical constants ($n_d$, $v_d$) by selecting their compositions as required. For obtaining an optical glass I having a refractive index $n_d$ of approximately 1.70 or more, an Abbe number $v_d$ of approximately 28 to 41, a contact angle of at least 40° and a sag temperature of 580° C. or lower, it is preferred to incorporate lithium oxide, calcium oxide, titanium oxide and niobium oxide in addition to silicon oxide and boron oxide.

Of the above glass components, silicon oxide and boron oxide are both required as glass-forming components. Further, silicon oxide is an essential component for obtaining an optical glass having a low wettability with Pt and a Pt alloy.

Lithium oxide is a component for improving the meltability of silicon oxide, and it is important for obtaining a glass having a low sag temperature $T_s$.

Calcium oxide is a component which works to decrease the liquidus temperature of an optical glass when the optical glass having a high refractive index and a high- or intermediate-dispersion is produced. It is also necessary for obtaining an optical glass having a low wettability with Pt and a Pt alloy.

Titanium oxide and niobium oxide are both components required for obtaining an optical glass having a high refractive index, and these components are also necessary for obtaining a high-dispersion optical glass.

When the optical glass I is used for obtaining a precision-press shapeable material, the optical glass I is preferably to have a sag temperature $T_s$ of approximately 580° C. or lower for preventing damage of a shaping mold during its precision-press shaping. By combining the above six glass components, or by optionally incorporating other components as required, there can be easily obtained an optical glass I having a refractive index $n_d$ of approximately 1.70 or more and an Abbe number $v_d$ of approximately 28 to 41 and having the contact angle of at least 40° and a sag temperature $T_s$ of 580° C. or lower.

The optical glass I having a refractive index $n_d$ of approximately 1.70 or more and an Abbe number $v_d$ of approximately 28 to 41 and having a contact angle of at least 40° and a sag temperature of 580° C. or lower can be obtained by preparing the following composition (1) or (2).

(1) A composition comprising silicon oxide, boron oxide, lithium oxide, calcium oxide, titanium oxide and niobium oxide, the total content of silicon oxide, boron oxide, lithium oxide, calcium oxide, titanium oxide and niobium oxide being at least 63% by weight, the content of the silicon oxide being 17 to 33% by weight (exclusive of 17% by weight and 33% by weight), the content of the boron oxide being 1 to 25% by weight, the content of the lithium oxide being 5 to 11% by weight, the content of the calcium oxide being 5 to 27% by weight (exclusive of 5% by weight), the content of the titanium oxide being 1 to 20% by weight, the content of the niobium oxide being 13 to 30% by weight (exclusive of 13% by weight), the total content of the silicon oxide and the boron oxide being 20 to 50% by weight, the optical glass further comprising 0 to 16% by weight, exclusive of 16% by weight, of lanthanum oxide, 0 to 12% by weight of zinc oxide, 0 to 15% by weight of barium oxide, 0 to 10% by weight of zirconium oxide, 0 to 10% by weight of strontium oxide, 0 to 6% by weight of tungsten oxide, 0 to 7% by weight of aluminum oxide, 0 to 5% by weight of sodium oxide, 0 to 5% by weight of potassium oxide, 0 to 5% by weight of yttrium oxide, 0 to 5% by weight of gadolinium oxide, 0 to 5% by weight of ytterbium oxide, 0 to 5% by weight of tantalum oxide, 0 to 2% by weight of arsenic oxide and 0 to 2% by weight of antimony oxide. In the above glass composition, naturally, the ratio of the silicon oxide content to the boron oxide content is greater than 0.78 as described already.

(2) A composition comprising silicon oxide, boron oxide, lithium oxide, calcium oxide, titanium oxide and niobium oxide, the total content of silicon oxide, boron oxide, lithium oxide, calcium oxide, titanium oxide and niobium oxide being at least 63% by weight, the content of the silicon oxide being 17 to 33% by weight (exclusive of 17% by weight and 33% by weight), the content of the boron oxide being 1 to 25% by weight, the content of the lithium oxide being 5 to 11% by weight, the content of the calcium oxide being 5 to 27% by weight (exclusive of 5% by weight), the content of the titanium oxide being 1 to 20% by weight, the content of the niobium oxide being 13 to 30% by weight (exclusive of 13% by weight), the total content of the silicon oxide and the boron oxide being 20 to 50% by weight, the optical glass further comprising 0 to 16% by weight, exclusive of 16% by weight, of lanthanum oxide, 0 to 12% by weight of zinc oxide, 0 to 15% by weight of barium oxide, 0 to 10% by weight of zirconium oxide, 0 to 10% by weight of strontium oxide, and 0 to 2% by weight of antimony oxide. In the above glass composition, naturally, the ratio of the silicon oxide content to the boron oxide content is greater than 0.78 as described already.

The reason why it is preferred to adjust the content of each of the above components (1) and (2) to the above range is as follows.

That is, when the content of silicon oxide is less than 17% by weight, it is sometimes difficult to obtain an optical glass having the contact angle of at least 40°. When it is 33% by weight or more, it is difficult to obtain a glass having a high refractive index. The content of silicon oxide is more preferably 17.5 to 31% by weight.

When the content of boron oxide is less than 1% by weight, it is sometimes difficult to form a glass. When it exceeds 25% by weight, it is difficult to obtain a glass having a high refractive index, and further, a glass is liable to have striae due to the volatilization of the boron oxide. The content of boron oxide is more preferably 1.5 to 22% by weight.

When the content of lithium oxide is less than 5% by weight, non-melted substance of silicon oxide is sometimes liable to remain in a glass, and it is sometimes difficult to obtain a glass having a sag temperature $T_s$ of approximately 580° C. or lower. When it exceeds 11% by weight, a glass has a high liquidus temperature, which results in poor mass-productivity, and it is sometimes difficult to obtain an optical glass having a high refractive index. The content of lithium oxide is more preferably 5.3 to 9.5% by weight, still more preferably 6.5 to 9.5% by weight.

When the content of calcium oxide is less than 5% by weight, the above effect produced by incorporating calcium oxide is substantially not obtained in some cases. When it exceeds 27% by weight, a glass sometimes has a high liquidus temperature. The content of calcium oxide is more preferably 5.5 to 24.5% by weight, still more preferably 6.5 to 22% by weight.

When the content of titanium oxide is less than 1% by weight, the above effect produced by incorporating titanium oxide is substantially not obtained in some cases. When it exceeds 20% by weight, a glass sometimes has a high liquidus temperature, and the coloring of a glass intensifies in some cases. The content of titanium oxide is more preferably 2.5 to 18% by weight.

When the content of niobium oxide is 13% by weight or less, the effect produced by incorporating niobium oxide is substantially not obtained in some cases. When it exceeds 30% by weight, a glass sometimes has a high liquidus temperature. The content of niobium oxide is more preferably 13 to 27.5% by weight (exclusive of 13% by weight).

While the contents of silicon oxide, boron oxide, lithium oxide, calcium oxide, titanium oxide and niobium oxide are within the above ranges, if the total content of these is less than 63% by weight, it is sometimes difficult to obtain an optical glass having a refractive index $n_d$ of approximately 1.70 or more and an Abbe number $v_d$ of approximately 28 to 41 and having a sag temperature $T_s$ of 580° C. or lower. The above total content is preferably at least 65% by weight.

Further, when the total content of silicon oxide and boron oxide is less than 20% by weight, it is difficult to form a glass in some cases. When the above total content exceeds 50% by weight, it is difficult to obtain an optical glass having a high refractive index in some cases. The total content of silicon oxide and boron oxide is more preferably 24 to 43% by weight.

Further, when the ratio of the silicon oxide content to the boron oxide content is 0.78 or less, it is sometimes difficult to obtain an optical glass having the contact angle of at least 40°. When the above ratio exceeds 30, the liquidus temperature is sometimes too high. The above ratio is particularly preferably 0.8 to 27.

Of the components whose contents may be zero (these components will be referred to as "optional components" hereinafter), lanthanum oxide, barium oxide, zirconium oxide, strontium oxide, tungsten oxide, aluminum oxide, yttrium oxide, gadolinium oxide, ytterbium oxide and tantalum oxide work to decrease the liquidus temperature of the glass, respectively, when added in a proper amount each. When the contents of these components are properly selected from the above ranges, the optical constants ($n_d$, $v_d$) of the glass can be adjusted. However, when the content of even one of these components exceeds the above corresponding range, the liquidus temperature of the glass may adversely increase. More preferably, the content of lanthanum oxide is 0 to 15% by weight, the content of barium oxide is 0 to 12% by weight, the content of zirconium oxide is 0 to 7% by weight, the content of strontium oxide is 0 to 8% by weight, the content of tungsten oxide is 0 to 4% by weight, the content of aluminum oxide is 0 to 5% by weight, the content of yttrium oxide is 0 to 3% by weight, the content of gadolinium oxide is 0 to 3% by weight, the content of ytterbium oxide is 0 to 3% by weight, and the content of tantalum oxide is 0 to 3% by weight. And, the content of lanthanum oxide is still more preferably 0 to 13% by weight.

Zinc oxide, sodium oxide and potassium oxide which are among the optional components work to decrease the sag temperature $T_s$ of the glass, respectively, when added in a proper amount each. However, when the content of even one of these components exceeds the above corresponding range, the liquidus temperature of the glass increases, and the devitrification of the glass intensifies. More preferably, the content of zinc oxide is 0 to 11% by weight, the content of sodium oxide is 0 to 3% by weight, and the content of potassium oxide is 0 to 3% by weight.

Arsenic oxide and antimony oxide which are among the optional components work as a refining agent or a refining agent, respectively, when added in a proper amount each. However, when the content of even one of these exceeds the above corresponding range, the liquidus temperature of the glass may increase. More preferably, the content of arsenic oxide is 0 to 2% by weight, and the content of antimony oxide is 0 to 2% by weight.

Of the above optional components, lanthanum oxide, zirconium oxide and zinc oxide have an advantage that they do not much decrease the devitrification resistance as compared with the other optional components.

The optical glass I of the present invention may contain phosphorus oxide, germanium oxide, cesium oxide, manganese oxide, tellurium oxide, bismuth oxide or lead oxide so long as the object of the present invention is not impaired. Since, however, phosphorus oxide works to decrease the contact angle of the glass to Pt or a Pt alloy, the content thereof is preferably less than 4% by weight, more preferably less than 3% by weight.

For obtaining the above-explained optical glass I of the present invention, first, predetermined amounts of predetermined raw materials are weighed depending upon the composition of an intended optical glass, and mixed to prepare a formulated mixture. Then, the formulated mixture is melted in a melting furnace at 1,000 to 1,350° C., to obtain a glass melt, and the glass melt is refined and then stirred to obtain a homogeneous glass melt. Then, the homogeneous glass melt is directed through a flow pipe to a predetermined site, and after or while the glass melt which has flowed down from the flow pipe is shaped into a predetermined form, it is gradually cooled, whereby the optical glass I of the present invention can be produced. In the above production, $B_2O_3$, $H_3BO_3$, or the like can be used as required as a raw material for the boron oxide, $Al_2O_3$, $Al(OH)_3$, or the like can be used as required as a raw material for the aluminum oxide, and carbonates, nitrates, oxides, etc., of cation elements constituting the intended components can be used as required as raw materials for the other components.

The optical glass II of the present invention will be explained hereinafter.

As already explained, the optical glass II of the present invention comprises silicon oxide, boron oxide, lithium oxide, calcium oxide, titanium oxide and niobium oxide, the total content of silicon oxide, boron oxide, lithium oxide, calcium oxide, titanium oxide and niobium oxide being at least 63% by weight, the content of the silicon oxide being 17 to 33% by weight (exclusive of 17% by weight and 33% by weight), the content of the boron oxide being 1 to 25% by weight, the content of the lithium oxide being 5 to 11% by weight, the content of the calcium oxide being 5 to 27% by weight (exclusive of 5% by weight), the content of the titanium oxide being 1 to 20% by weight, the content of the niobium oxide being 13 to 30% by weight (exclusive of 13% by weight), the total content of the silicon oxide and the boron oxide being 20 to 50% by weight, the ratio of the silicon oxide content to the boron oxide content being greater than 0.78, the optical glass further comprising 0 to 16% by weight, exclusive of 16% by weight, of lanthanum oxide, 0 to 12% by weight of zinc oxide, 0 to 15% by weight of barium oxide, 0 to 10% by weight of zirconium oxide, 0 to 10% by weight of strontium oxide, 0 to 6% by weight of tungsten oxide, 0 to 7% by weight of aluminum oxide, 0 to 5% by weight of sodium oxide, 0 to 5% by weight of potassium oxide, 0 to 5% by weight of yttrium oxide, 0 to 5% by weight of gadolinium oxide, 0 to 5% by weight of ytterbium oxide, 0 to 5% by weight of tantalum oxide, 0 to 2% by weight of arsenic oxide and 0 to 2% by weight of antimony oxide.

That is, the optical glass II of the present invention is one of preferred embodiments of the present invention, and an explanation on the composition thereof will be therefore omitted.

The above optical glass II can be easily obtained as an optical glass having a refractive index ($n_d$) of approximately 1.70 or more, an Abbe number ($v_d$) of approximately 28 to 41, the contact angle of at least 40° and a sag temperature $T_s$ of approximately 580° C. or lower.

The precision-press shapeable material of the present invention will be explained hereinafter.

The precision-press shapeable material of the present invention is formed of the above optical glass I or II of the present invention which is shaped into a predetermined form, as described already.

The form of the precision-press shapeable material is not specially limited, and the precision-press shapeable material has the form of a sphere, a marble, a flat plate, a column, a round loaf, or the like depending upon the form of a shaped article to be obtained by precision-press shaping.

The precision-press shapeable material is formed of the above optical glass I or II of the present invention, i.e., the above optical glass which is almost free from the wet backward phenomenon even if flowed down from a small-diametered flow pipe and which can easily give a high-refractivity high- or intermediate dispersion product, and therefore, it can easily give a small-sized high-refractivity high- or intermediate-dispersion product.

The method of producing the precision-press shapeable material of the present invention having the above advantage is not specially limited, and it can be properly selected from a cold processing such as cutting and polishing, the method of the invention disclosed in JP-A-61-146721, or the method of the invention disclosed in JP-B-7-51446 depending upon an intended form, and the like.

In view of properties of the optical glass I and the optical glass II of the present invention and total productivity of the precision-press shapeable material and an optical product formed from the precision-press shapeable material, it is preferred to employ the process for the production of a precision-press shapeable material according to the present invention, i.e., the process comprising dropping a glass melt for the above optical glass I or II of the present invention from an outlet of a flow pipe made of Pt or a Pt alloy to form a glass gob and shaping the glass gob to obtain the precision-press shapeable material.

The optical product of the present invention will be explained hereinafter.

The optical product of the present invention is a product formed of the optical glass I or II of the present invention as described already.

Specific examples thereof include optical elements such as a lens, a prism, and the like.

In view of productivity of an optical product as an end product, the optical product is preferably produced by precision-press shaping the above precision-press shapeable material of the present invention in a mold having a predetermined cavity form.

The above optical product is not limited in kind, and the form of the above precision-press shapeable material is accordingly not specially limited in form. The above precision-press shapeable material can have the form, for example, of a marble, a flat plate, a column, a sphere, a round loaf, or the like depending upon the form and kind of an optical product as an end product.

As described already, in view of properties of the optical glass I and the optical glass II of the present invention and total productivity of the precision-press shapeable material and an optical product formed from the precision-press shapeable material, the above precision-press shapeable material is preferably a precision-press shapeable material produced according to process for the production of a precision-press shapeable material, provided by the present invention.

The optical product of the present invention is a product formed of the optical glass I or II of the present invention. The optical glass I of the present invention is almost free from the wet backward phenomenon even if flowed down from a small-diametered flow pipe, which can easily give a high-refractivity high- or intermediate dispersion product and which has a sag temperature of 580° C. or lower, as explained already. The optical glass II of the present invention can be easily obtained a high-refractivity high- or intermediate dispersion optical glass which is almost free from the wet backward phenomenon even if flowed down from a small-diametered flow pipe, and which have a sag temperature of 580° C. or lower, as explained already.

Therefore, the optical product of the present invention can be easily obtained as a small-sized, high-refractivity and high- or intermediate dispersion product. Further, it can be easily obtained by a precision-press shaping method.

For example, when the optical product of the present invention is a lens, lenses having various sizes, such as a large lens having a diameter of 20 mm or more, a small lens having a diameter of 20 mm or less, a micro-lens having a diameter of 12 mm or less, an ultra micro-lens having a diameter of 8 mm or less and a micro micro-lens having a diameter of 4 mm or less can be obtained. These lenses can be used by incorporating them, for example, in cameras, VTRs, and the like, and they can be also used as an objective lens, a collimator lens, etc., for use in a laser optical system such as an optical pick-up.

When the optical product of the present invention is produced by precision-press shaping, for example, a process for the production of an optical product, provided by the present invention, which is explained below can be adopted.

The process for the production of an optical product of the present invention will be explained hereinafter.

The process for the production of an optical product, provided by the present invention, is a process for producing the above optical product of the present invention by a precision-press shaping method. The above process comprises the steps of placing a precision-press shapeable material produced by the above process for the production of a precision-press shapeable material, provided by the present invention, in a shaping mold comprising at least an upper mold member and a lower mold member for forming a predetermined cavity form, and precision-press shaping the above precision-press shapeable material into a predetermined form with the above shaping mold while the precision-press shapeable material is a softened state under heat.

The above shaping mold may be a mold which forms a predetermined cavity form with an upper mold member and a lower mold member, or it may be a mold which forms a predetermined cavity form with an upper mold member, a lower mold member and a guide mold member (sleeve).

The above precision-press shaping with the above shaping mold is preferably carried out while the above precision-press shapeable material has a viscosity of approximately $10^6$ to $10^9$ poise (approximately $10^5$ to $10^8$ Pa·s), preferably approximately $10^7$ to $10^9$ poise (approximately $10^6$ to $10^8$ Pa·s), more preferably approximately $10^{7.5}$ to $10^{8.5}$ poise (approximately $10^{6.5}$ to $10^{7.5}$ Pa·s).

According to the above press-shaping, there can be obtained an end optical product (the above optical product of the present invention) or an optical product (also included in the above optical product of the present invention) having a form very close to the form of the end product. When an optical product having a form very close to the form of the end product is obtained by the precision-press shaping, the so-obtained optical product is processed in a post step as required, to obtain an end product (also included in the above optical product of the present invention).

The present invention will be explained with reference to Examples hereinafter, while the present invention shall not be limited to these Examples.

EXAMPLES 1–29 and Comparative Examples 1–5

In each Examples or in each Comparative examples, predetermined amounts of predetermined raw materials were weighed so as to obtain a glass composition shown in Table 1, 2, 3, 4, 5 or 6, and the raw materials were mixed to obtain a formulated raw material. The formulated raw material was melted in a melting furnace at 1,000 to 1,350° C. to prepare a glass melt, and the glass melt was refined and stirred to obtain a homogeneous glass melt. The glass melt was cast into a mold having a predetermined cavity form and then gradually cooled to give an intended optical glass.

In the above case, as a raw material for boron oxide, $H_3BO_3$ was used, and as a raw material for aluminum oxide, $Al(OH)_3$ was used. As raw materials for lithium oxide, sodium oxide, potassium oxide, calcium oxide and barium oxide, carbonates of cation elements constituting these oxides were used, and as a raw material for strontium oxide, nitrate of strontium was used. As raw materials for the other components, oxides were used.

The above-obtained optical glass was measured for a refractive index $n_d$, an Abbe number $v_n$, a sag temperature $T_s$, a liquidus temperature L.T. and a contact angle as follows. Tables 1 to 6 shows the results.

Refractive index $n_d$ and Abbe number $v_n$

A glass melt cast into a mold was gradually cooled at a temperature decrease rate of −30° C./hour to obtain an optical glass, and the optical glass was measured.

Sag temperature $T_s$

Measured with a thermal expansion measuring machine at a temperature elevation rate of 8° C./minute.

Liquidus temperature L.T.

A predetermined number of samples were prepared in each Examples and in each Comparative Examples, and the samples were placed in devitrification testing furnaces having a temperature gradient of 500 to 1,100° C., and after they were maintained for 30 minutes, they were cooled to room temperature. Then, these samples were observed through a microscope having a magnification of 100, and the lowest devitrification test temperature at which no formation of a crystal was found was taken as a liquidus temperature.

Contact angle

A plate made of 95Pt-5Au was used as a plate 5 (see FIG. 2), and the heating temperature for melting a glass sample was set at a temperature higher than the liquidus temperature L.T. by 20° C. The measurement was carried out as already explained.

In addition, it was found that the value of a contact angle measured as described above is nearly equivalent to the value of a contact angle of a glass sample melted under the above conditions to the plate 5 (see FIG. 2) through a high-temperature microscope.

TABLE 1

|  | Ex. 1 | Ex. 2 | Ex. 3 | Ex. 4 | Ex. 5 | Ex. 6 |
|---|---|---|---|---|---|---|
| Silicon oxide ($SiO_2$) | 17.6 | 30.4 | 17.9 | 19.5 | 28.4 | 18.5 |
| Boron oxide ($B_2O_3$) | 20.0 | 4.2 | 21.5 | 17.9 | 4.2 | 17.9 |
| Lithium oxide ($Li_2O$) | 5.3 | 7.0 | 5.5 | 9.5 | 7.0 | 6.0 |
| Calcium oxide (CaO) | 17.4 | 8.0 | 19.4 | 18.4 | 5.5 | 24.4 |
| Titanium oxide ($TiO_2$) | 4.9 | 15.0 | 2.9 | 4.9 | 17.0 | 4.9 |
| Niobium oxide ($Nb_2O_5$) | 13.4 | 15.5 | 13.4 | 13.4 | 15.5 | 13.4 |
| Total content of the above six components | 78.6 | 80.1 | 80.6 | 83.6 | 77.6 | 85.1 |
| Total content of silicon oxide and boron oxide | 37.6 | 34.6 | 39.4 | 37.4 | 32.6 | 36.4 |
| Silicon oxide/Boron oxide | 0.88 | 7.24 | 0.83 | 1.09 | 6.76 | 1.03 |
| Optional components |  |  |  |  |  |  |
| Lanthanum oxide ($La_2O_3$) | 12.2 | 3.3 | 12.0 | 11.2 | 7.3 | 6.7 |
| Zinc oxide (ZnO) | — | 6.3 | 2.0 | — | 6.1 | 2.0 |
| Barium oxide (BaO) | — | 7.3 | — | — | 5.8 | — |
| Zirconium oxide ($ZrO_2$) | 5.2 | 2.0 | 5.2 | 5.2 | 2.0 | 6.2 |
| Strontium oxide (SrO) | — | 1.0 | — | — | 1.0 | — |
| Tungsten oxide ($WO_3$) | — | — | — | — | — | — |
| Aluminum oxide ($Al_2O_3$) | 4.0 | — | — | — | — | — |
| Sodium oxide ($Na_2O$) | — | — | — | — | — | — |
| Potassium oxide ($K_2O$) | — | — | — | — | — | — |
| Yttrium oxide ($Y_2O_3$) | — | — | — | — | — | — |
| Gadolinium oxide ($Gd_2O_3$) | — | — | — | — | — | — |
| Ytterbium oxide ($Yb_2O_3$) | — | — | — | — | — | — |
| Tantalum oxide ($Ta_2O_5$) | — | — | — | — | — | — |
| Arsenic oxide ($As_2O_3$) | — | — | — | — | 0.2 | — |
| Antimony oxide ($Sb_2O_3$) | — | — | 0.2 | — | — | — |
| Total content | 100 | 100 | 100 | 100 | 100 | 100 |
| Refractive index $n_d$ | 1.7209 | 1.7886 | 1.7817 | 1.7415 | 1.8137 | 1.7320 |
| Abbe number $v_d$ | 40.6 | 31.2 | 35.6 | 40.3 | 29.4 | 40.6 |
| Sag temperature ($T_s$) | 565 | 572 | 536 | 525 | 577 | 540 |
| Liquidus temperature L.T. (° C.) | 950 | 980 | 950 | 930 | 980 | 940 |
| Contact angle (°) | 55 | 60 | 56 | 58 | 62 | 59 |

*: Values in ech column show component contents (unit: wt %).
*: Ex. = Example

TABLE 2

|  | Ex. 7 | Ex. 8 | Ex. 9 | Ex. 10 | Ex. 11 | Ex. 12 |
|---|---|---|---|---|---|---|
| Silicon oxide ($SiO_2$) | 26.4 | 18.5 | 18.2 | 26.4 | 26.4 | 25.4 |
| Boron oxide ($B_2O_3$) | 4.2 | 17.9 | 21.9 | 4.2 | 2.2 | 3.2 |
| Lithium oxide ($Li_2O$) | 7.0 | 6.5 | 6.0 | 7.0 | 7.0 | 6.0 |
| Calcium oxide (CaO) | 9.3 | 17.6 | 12.4 | 8.0 | 8.0 | 8.0 |
| Titanium oxide ($TiO_2$) | 11.0 | 4.9 | 3.9 | 15.0 | 13.0 | 15.0 |
| Niobium oxide ($Nb_2O_5$) | 27.5 | 14.4 | 13.4 | 15.5 | 15.5 | 15.5 |
| Total content of the above six components | 85.4 | 79.8 | 75.8 | 76.1 | 72.1 | 73.1 |
| Total content of silicon oxide and boron oxide | 30.6 | 36.4 | 40.1 | 30.6 | 28.6 | 28.6 |
| Silicon oxide/Boron oxide | 6.29 | 1.03 | 0.83 | 6.29 | 12.0 | 7.94 |
| Optional components |  |  |  |  |  |  |

TABLE 2-continued

|  | Ex. 7 | Ex. 8 | Ex. 9 | Ex. 10 | Ex. 11 | Ex. 12 |
| --- | --- | --- | --- | --- | --- | --- |
| Lanthanum oxide ($La_2O_3$) | — | 15.0 | 13.0 | 3.3 | 11.3 | 3.3 |
| Zinc oxide (ZnO) | 6.3 | — | 3.0 | 6.3 | 8.3 | 6.3 |
| Barium oxide (BaO) | 7.3 | — | — | 11.3 | 7.3 | 7.3 |
| Zirconium oxide ($ZrO_2$) | — | 5.2 | 6.2 | 2.0 | 1.0 | 2.0 |
| Strontium oxide (SrO) | 1.0 | — | — | 1.0 | — | 8.0 |
| Tungsten oxide ($WO_3$) | — | — | — | — | — | — |
| Aluminum oxide ($Al_2O_3$) | — | — | — | — | — | — |
| Sodium oxide ($Na_2O$) | — | — | — | — | — | — |
| Potassium oxide ($K_2O$) | — | — | — | — | — | — |
| Yttrium oxide ($Y_2O_3$) | — | — | — | — | — | — |
| Gadolinium oxide ($Gd_2O_3$) | — | — | — | — | — | — |
| Ytterbium oxide ($Yb_2O_3$) | — | — | — | — | — | — |
| Tantalum oxide ($Ta_2O_5$) | — | — | 2.0 | — | — | — |
| Arsenic oxide ($As_2O_3$) | — | — | — | — | — | — |
| Antimony oxide ($Sb_2O_3$) | — | — | — | — | — | — |
| Total content | 100 | 100 | 100 | 100 | 100 | 100 |
| Refractive index $n_d$ | 1.8138 | 1.7410 | 1.7420 | 1.8029 | 1.8174 | 1.8116 |
| Abbe number $v_d$ | 29.9 | 40.1 | 39.5 | 30.9 | 32.4 | 30.8 |
| Sag temperature ($T_s$) | 571 | 553 | 555 | 560 | 572 | 570 |
| Liquidus temperature L.T. (° C.) | 980 | 950 | 960 | 980 | 980 | 980 |
| Contact angle (°) | 65 | 53 | 58 | 62 | 63 | 61 |

*: Values in ech column show component contents (unit: wt %).
*: Ex. = Example

TABLE 3

|  | Ex. 13 | Ex. 14 | Ex. 15 | Ex. 16 | Ex. 17 | Ex. 18 |
| --- | --- | --- | --- | --- | --- | --- |
| Silicon oxide ($SiO_2$) | 26.4 | 19.2 | 19.2 | 18.2 | 18.2 | 18.2 |
| Boron oxide ($B_2O_3$) | 2.2 | 21.9 | 21.9 | 21.9 | 21.9 | 21.9 |
| Lithium oxide ($Li_2O$) | 6.0 | 5.5 | 5.5 | 6.0 | 6.0 | 6.0 |
| Calcium oxide (CaO) | 5.5 | 12.4 | 12.4 | 12.4 | 12.4 | 12.4 |
| Titanium oxide ($TiO_2$) | 12.0 | 3.9 | 3.9 | 3.9 | 3.9 | 3.9 |
| Niobium oxide ($Nb_2O_5$) | 15.5 | 13.4 | 13.4 | 13.4 | 13.4 | 13.4 |
| Total content of the above six components | 67.6 | 76.3 | 76.3 | 75.8 | 75.8 | 75.8 |
| Total content of silicon oxide and boron oxide | 28.6 | 41.1 | 41.1 | 40.1 | 40.1 | 40.1 |
| Silicon oxide/Boron oxide | 12.0 | 0.88 | 0.88 | 0.83 | 0.83 | 0.83 |
| Optional components |  |  |  |  |  |  |
| Lanthanum oxide ($La_2O_3$) | 11.3 | 13.0 | 13.0 | 13.0 | 13.0 | 13.0 |
| Zinc oxide (ZnO) | 10.3 | 2.5 | 2.5 | 3.0 | 3.0 | 3.0 |
| Barium oxide (BaO) | 6.8 | — | — | — | — | — |
| Zirconium oxide ($ZrO_2$) | 1.0 | 6.2 | 6.2 | 6.2 | 6.2 | 6.2 |
| Strontium oxide (SrO) | — | — | — | — | — | — |
| Tungsten oxide ($WO_3$) | 3.0 | — | — | — | — | — |
| Aluminum oxide ($Al_2O_3$) | — | — | — | — | — | — |
| Sodium oxide ($Na_2O$) | — | 2.0 | — | — | — | — |
| Potassium oxide ($K_2O$) | — | — | 2.0 | — | — | — |
| Yttrium oxide ($Y_2O_3$) | — | — | — | 2.0 | — | — |
| Gadolinium oxide ($Gd_2O_3$) | — | — | — | — | 2.0 | — |
| Ytterbium oxide ($Yb_2O_3$) | — | — | — | — | — | 2.0 |
| Tantalum oxide ($Ta_2O_5$) | — | — | — | — | — | — |
| Arsenic oxide ($As_2O_3$) | — | — | — | — | — | — |
| Antimony oxide ($Sb_2O_3$) | — | — | — | — | — | — |
| Total content | 100 | 100 | 100 | 100 | 100 | 100 |
| Refractive index $n_d$ | 1.8150 | 1.7275 | 1.7265 | 1.7323 | 1.7320 | 1.7410 |
| Abbe number $v_d$ | 31.1 | 40.5 | 40.5 | 40.7 | 40.8 | 40.1 |
| Sag temperature ($T_s$) | 577 | 567 | 570 | 558 | 560 | 553 |
| Liquidus temperature L.T. (° C.) | 980 | 930 | 940 | 950 | 950 | 950 |
| Contact angle (°) | 60 | 55 | 53 | 57 | 58 | 56 |

*: Values in ech column show component contents (unit: wt %).
*: Ex. = Example

TABLE 4

|  | Ex. 19 | Ex. 20 | Ex. 21 | Ex. 22 | Ex. 23 | Ex. 24 |
|---|---|---|---|---|---|---|
| Silicon oxide ($SiO_2$) | 31.8 | 18 | 32 | 19 | 19.5 | 28.5 |
| Boron oxide ($B_2O_3$) | 1.2 | 21.5 | 2 | 24 | 18 | 4 |
| Lithium oxide ($Li_2O$) | 7 | 5.5 | 7 | 5.5 | 10 | 7 |
| Calcium oxide (CaO) | 8 | 18 | 8 | 12 | 16.5 | 5.5 |
| Titanium oxide ($TiO_2$) | 13 | 2 | 15 | 4 | 5 | 19 |
| Niobium oxide ($Nb_2O_5$) | 13.5 | 15 | 16 | 13.5 | 14 | 15.5 |
| Total content of the above six components | 74.5 | 80.0 | 80 | 78 | 83 | 79.5 |
| Total content of silicon oxide and boron oxide | 33.0 | 39.5 | 34 | 43 | 37.5 | 32.5 |
| Silicon oxide/Boron oxide | 26.5 | 0.84 | 16 | 0.80 | 1.08 | 7.13 |
| Optional components |  |  |  |  |  |  |
| Lanthanum oxide ($La_2O_3$) | 5 | 12 | 3.5 | 15 | 11 | 7.5 |
| Zinc oxide (ZnO) | 8.5 | — | 7 | 3 | — | 6 |
| Barium oxide (BaO) | 8 | — | 7.5 | — | — | 6 |
| Zirconium oxide ($ZrO_2$) | 2 | 8 | 1 | 4 | 5 | — |
| Strontium oxide (SrO) | 2 | — | 1 | — | — | 1 |
| Tungsten oxide ($WO_3$) | — | — | — | — | — | — |
| Aluminum oxide ($Al_2O_3$) | — | — | — | — | — | — |
| Sodium oxide ($Na_2O$) | — | — | — | — | — | — |
| Potassium oxide ($K_2O$) | — | — | — | — | — | — |
| Yttrium oxide ($Y_2O_3$) | — | — | — | — | — | — |
| Gadolinium oxide ($Gd_2O_3$) | — | — | — | — | — | — |
| Ytterbium oxide ($Yb_2O_3$) | — | — | — | — | — | — |
| Tantalum oxide ($Ta_2O_5$) | — | — | — | — | — | — |
| Arsenic oxide ($As_2O_3$) | — | — | — | — | — | — |
| Antimony oxide ($Sb_2O_3$) | — | — | — | — | 1 | — |
| Total content | 100 | 100 | 100 | 100 | 100 | 100 |
| Refractive index $n_d$ | 1.7521 | 1.7485 | 1.7884 | 1.7263 | 1.7421 | 1.8197 |
| Abbe number $\nu_d$ | 33.8 | 39.2 | 31.3 | 40.9 | 40.4 | 28.6 |
| Sag temperature ($T_s$) | 565 | 540 | 570 | 575 | 515 | 575 |
| Liquidus temperature L.T. (° C.) | 970 | 950 | 970 | 930 | 930 | 980 |
| Contact angle (°) | 62 | 58 | 62 | 55 | 55 | 61 |

*: Values in ech column show component contents (unit: wt %).
*: Ex. = Example

TABLE 5

|  | Ex. 25 | Ex. 26 | Ex. 27 | Ex. 28 | Ex. 29 |
|---|---|---|---|---|---|
| Silicon oxide ($SiO_2$) | 18.5 | 26.5 | 26.5 | 25.5 | 26.5 |
| Boron oxide ($B_2O_3$) | 16.5 | 4 | 2.5 | 3.5 | 4 |
| Lithium oxide ($Li_2O$) | 6 | 7 | 6 | 6 | 7 |
| Calcium oxide (CaO) | 26 | 9.5 | 5.5 | 8 | 8 |
| Titanium oxide ($TiO_2$) | 5 | 11 | 12 | 15 | 13.5 |
| Niobium oxide ($Nb_2O_5$) | 13.5 | 29 | 15.5 | 15.5 | 15.5 |
| Total content of the above six components | 85.5 | 87.0 | 68.0 | 73.5 | 74.5 |
| Total content of silicon oxide and boron oxide | 35.0 | 30.5 | 29.0 | 29.0 | 37.5 |
| Silicon oxide/Boron oxide | 1.12 | 6.63 | 10.6 | 7.29 | 1.08 |
| Optional components |  |  |  |  |  |
| Lanthanum oxide ($La_2O_3$) | 6.5 | — | 11.5 | 3 | 2.5 |
| Zinc oxide (ZnO) | 2 | 6.3 | 12 | 6 | 6 |
| Barium oxide (BaO) | — | 5.7 | 7 | 6.5 | 14 |
| Zirconium oxide ($ZrO_2$) | 6 | — | 1 | 2 | 2 |
| Strontium oxide (SrO) | — | 1 | — | 9 | 1 |
| Tungsten oxide ($WO_3$) | — | — | — | — | — |
| Aluminum oxide ($Al_2O_3$) | — | — | — | — | — |
| Sodium oxide ($Na_2O$) | — | — | — | — | — |
| Potassium oxide ($K_2O$) | — | — | — | — | — |
| Yttrium oxide ($Y_2O_3$) | — | — | — | — | — |
| Gadolinium oxide ($Gd_2O_3$) | — | — | — | — | — |
| Ytterbium oxide ($Yb_2O_3$) | — | — | — | — | — |
| Tantalum oxide ($Ta_2O_5$) | — | — | — | — | — |
| Arsenic oxide ($As_2O_3$) | — | — | — | — | — |
| Antimony oxide ($Sb_2O_3$) | — | — | 0.5 | — | — |
| Total content | 100 | 100 | 100 | 100 | 100 |
| Refractive index $n_d$ | 1.7329 | 1.8188 | 1.814 | 1.8106 | 1.8015 |

TABLE 5-continued

|  | Ex. 25 | Ex. 26 | Ex. 27 | Ex. 28 | Ex. 29 |
|---|---|---|---|---|---|
| Abbe number $\nu_d$ | 40.1 | 29.4 | 31.2 | 30.9 | 31.5 |
| Sag temperature ($T_s$) | 540 | 571 | 570 | 570 | 560 |
| Liquidus temperature L.T. (° C.) | 950 | 980 | 970 | 970 | 980 |
| Contact angle (°) | 60 | 64 | 61 | 62 | 61 |

*: Values in ech column show component contents (unit: wt %).
*: Ex. = Example

TABLE 6

|  | C.Ex. 1 | C.Ex. 2 | C.Ex. 3 | C.Ex. 4 | C.Ex. 5 |
|---|---|---|---|---|---|
| Silicon oxide ($SiO_2$) | 3.0 | 5.0 | 16.0 | 19.96 | 3.99 |
| Boron oxide ($B_2O_3$) | 27.0 | 28.0 | 21.0 | 19.97 | 22.97 |
| Lithium oxide ($Li_2O$) | 1.0 | 1.0 | 6.0 | 4.99 | 2.50 |
| Calcium oxide (CaO) | — | — | 6.0 | 19.94 | 17.05 |
| Titanium oxide ($TiO_2$) | 6.0 | — | 13.5 | — | — |
| Niobium oxide ($Nb_2O_5$) | 6.0 | 5.0 | 4.5 | 16.16 | 20.07 |
| Lanthanum oxide ($La_2O_3$) | 34.0 | 29.0 | 15.5 | 13.06 | 25.90 |
| Zinc oxide (ZnO)) | 10.0 | 23.0 | 6.0 | — | — |
| Zirconium oxide ($ZrO_2$) | 4.0 | — | 1.5 | 4.94 | 4.96 |
| Tungsten oxide ($WO_3$) | 9.0 | 6.0 | — | — | — |
| Potassium oxide ($K_2O$) | — | — | — | 0.98 | 2.56 |
| Yttrium oxide ($Y_2O_3$) | — | — | 10.0 | — | — |
| Gadolinium oxide ($Gd_2O_3$) | — | — | — | — | — |
| Tantalum oxide ($Ta_2O_5$) | — | 3.0 | — | — | — |
| Total content | 100 | 100 | 100 | 100 | 100 |
| Silicon oxide/Boron oxide | 0.11 | 0.18 | 0.76 | 1.00 | 0.17 |
| Refractive index $n_d$ | 1.815 | 1.772 | 1.7683 | 1.7113 | 1.7761 |
| Abbe number $\nu_d$ | 36.0 | 38.6 | 34.9 | 44.6 | 40.0 |
| Sag temperature ($T_s$) | 600 | 571 | 570 | 570 | 554 |
| Liquidus temperature L.T. (° C.) | 900 | 920 | 1030 | 1010 | 1020 |
| Contact angle (°) | 35 | 34 | 34 | 45 | 30 |

*: Values in ech column show component contents (unit: wt %).
*: C.Ex. = Comparative Example As shown in Tables 1 to 5, the optical glasses obtained in Examples 1 to 29 are high-refractivity high- or intermediate-dispersion optical glasses having a refractive index $n_d$ of as high as 1.7209 to 1.8197 and an Abbe number of as high as 28.6 to 40.9, and the showed a large contact angle of 53 to 65°.

When a glass melt of each of the optical glasses obtained in Examples 1 to 29 is flowed down from a flow pipe made of Pt or a Pt alloy having a small inner diameter, e.g., of 1 to 8 mm, they are almost free from the foregoing "wet backward phenomenon".

As shown in Table 6, the optical glasses obtained in Comparative Examples 1 and 2 are high-refractivity high-or intermediate-dispersion optical glasses. In these optical glasses, however, the ratio of the silicon oxide content to the boron oxide content is 0.11 or 0.18 or outside the limited range in the present invention, and the contact angle is as small as 35° or 34°. The optical glass obtained in Comparative Example 3 is a high-refractivity high-dispersion glass corresponding to a glass in Example 6 described in JP-A-61-232243, and in this optical glass, the ratio of the silicon oxide content to the boron oxide content is 0.76 or outside the limited range in the present invention and the contact angle is as small as 37°.

Since the optical glasses obtained in Comparative Examples 1 to 3 have a small contact angle as described above, the above "wet backward phenomenon" is liable to take place when glass melts thereof are flowed down from the above flow pipe.

The optical glass obtained in Comparative Example 4 corresponds to a glass in Example 10 described in JP-A-61-146730, and has a refractive index of as high as 1.7113. Further, it has the contact angle of as large as 450°. Since, however, the optical glass has a large Abbe number of 45, it is not any high-dispersion or intermediate-dispersion optical glass that is an object of the present invention.

The optical glass obtained in Comparative Example is high-refractivity high-dispersion or intermediate-dispersion optical glass corresponding to a glass in Example 11 described in JP-A-61-146730. In this optical glass, however, the ratio of the silicon oxide content to the boron oxide content is 0.17 or outside the limited range of the present invention, and its contact angle is as small as 37°. When a glass melt of the optical glass is flowed down from the above flow pipe, the above "wet backward phenomenon" is liable to take place.

For example, as a method for mass-producing small-sized lenses by precision-press shaping, one method comprises dropping a certain glass melt from an outlet of a flow pipe made of Pt or a Pt alloy to obtain a glass gob, shaping the glass gob to obtain a precision-press shapeable material having the form of a nearly spherical substance, a sphere, a round loaf, or the like, and precision-press shaping the shapeable material into the above lens in a shaping mold having a predetermined cavity form.

Glass melts for optical glasses having compositions shown in Examples 1 to 29 have a large contact angle, referred to in the present invention, of 53 to 65° as already described, and therefore, they are suitable as raw materials for obtaining precision-press shapeable materials for small-sized lenses by the above method.

When glass melts (having a temperature at which their viscosity was 8 poise (0.8 Pa·s)) for optical glasses having compositions shown in Examples 1 to 29 were flowed down from a flow pipe which had an inner diameter of 2 mm and was made of a Pt alloy (95Pt-5Au) to continuously produce a predetermined number of precision-press shapeable materials for micro micro-lenses, the obtained precision-press shapeable materials were free of striae. Further, the weight variability among these precision-press shapeable materials was low.

With regard to some of glass melts for optical glasses having compositions shown in Examples 1 to 29, it will be more specifically explained below that the glass melts are suitable for mass-producing small-sized precision-press shapeable materials and small-sized precision-press shaped products.

Determination of Weight Difference glass melt for an optical glass having the composition shown in Example 11 was prepared, and directed to a predetermined site through a flow pipe disposed so as to have an outlet facing vertically downwardly and made of a Pt alloy having an inner diameter of 2 mm, and a glass gob which was obtained by dropping the glass melt from the outlet of the flow pipe of an Pt alloy was consecutively formed into 1,000 glass shaped articles having a predetermined form in a plurality of molds. A weight difference among these glass shaped articles was determined on the basis of the following expression.

Weight difference (%)=[(Maximum weight-minimum weight)/standard weight]×100

Maximum weight: Largest weight of a glass shaped article having the largest weight among the above 1,000 shaped articles Minimum weight: Smallest weight of a glass shaped article having the smallest weight among the above 1,000 shaped articles Standard weight: Design weight of the glass shaped article Further, with regard to an optical glass having the composition shown in Comparative Example 1 and an optical glass having the composition shown in Comparative Example 2, weight differences were determined in the same manner as above.

As a result, glass products obtained from the glass melt for an optical glass having the composition shown in Example 11 showed a small weight difference of 0.3%, while glass products obtained from the glass melt for an optical glass having the composition shown in Comparative Example 2 showed a large weight difference of 1.3%, and glass products obtained from the glass melt for an optical glass having the composition shown in Comparative Example 1 showed a still larger weight difference of 1.5%.

The above weight difference shows how weights vary among obtained glass products, and when the above weight difference of obtained optical products exceeds 1%, the optical products are no longer usable as such in some cases. For example, with regard to a precision-press shapeable material for obtaining a small optical product (optical product having a weight of 100 mg or less), the weight variability (the weight difference) is preferably within ±2%, more preferably within ±1%. With regard to a precision-press shapeable material for obtaining a large optical product (optical product having a weight of over 100 mg) larger than the small optical product, the weight variability (the weight difference) is preferably within ±5%, more preferably within ±3%, and particularly preferably within ±1%.

Therefore, the optical glass in Example 11, which can give glass products having a weight difference of 0.3%, is suitable as a glass material for mass-producing optical products.

Example 30

(Preparation of precision-press shapeable material)

There were prepared a predetermined number of shaping molds having a concave portion shaped in a predetermined form and a gas-blowing narrow hole opened in the bottom of the concave portion each, in which the perpendicular cross section of the concave portion was opened upwardly (upwardly in a perpendicular direction during use) to have the form of a trumpet. A glass melt for an optical glass having the composition shown in Example 1 was prepared. A predetermined number of spherical shaped products were obtained from the above glass melt according to the shaping method disclosed in JP-B-7-51446.

For the above shaping, shaping conditions shown in "Experimental Results 1" in the above JP-B-7-51446 were employed. That is, the concave portion of each of the above shaping molds had a "broadening angle θ" of 15°, and the above narrow holes had a diameter of 2 mm each. Further, the glass melt was directed to a site right above each of the above shaping mold through flow pipe which was disposed so as to face their flow outlets downwardly in a perpendicular direction and had an inner diameter of 1 mm and an end outer diameter of 2.5 mm, and the glass melt was allowed to drop of its own weight therefrom in a state where the glass melt had a viscosity of 8 poise (0.8 Pa·s). And, air was blown through the gas-blowing narrow hole of each shaping mold at a rate of 1 liter/minute beforehand, and the blowing was continued until each glass gobs which was formed by allowing the glass melt to drop of its own weight from the above flow pipe was fully cooled.

Under the above conditions, glass gobs which dropped of their own weights from the flow pipe were received in the concave portions without almost any contact to inner surfaces of the concave portions of the shaping molds, and they were whirled in a state where they were floated without almost any contact, to form spheres.

The above-obtained spherical shaped products had the form of a sphere having a low deviation from spherical form of 4.92 mm ±0.04 mm, and neither damage nor soiling were observed on their surfaces. Further, they had a high weight accuracy of as high as 220 mg ±0.5 mg.

The above shaped products are suitable as precision-press shapeable materials, for example, for obtaining high-refractivity high- or intermediate-dispersion aspherical lenses by precision-press forming.

Example 31

(Preparation of Optical Product)

Figure 3:
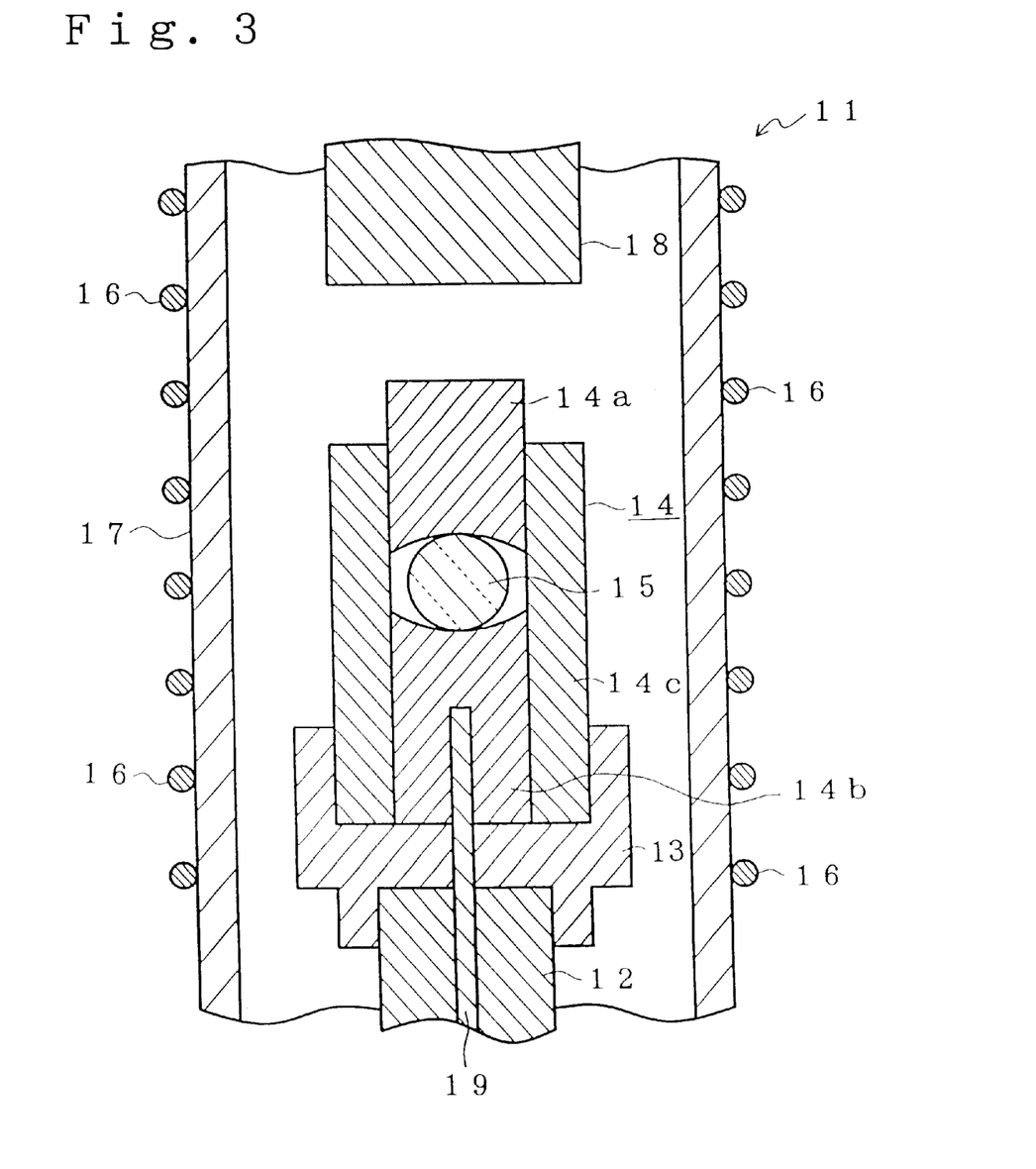
FIG. 3 is a schematic cross-sectional view of a precision-press forming apparatus used in Example 31 to be described later.

By using a shaped product obtained in Example 30 as a precision-press shapeable material, an aspherical lens having a diameter of 6.4 mm was obtained by precision-press shaping the material by means of a precision-press shaping machine shown in FIG. 3. The precision-press shaping was carried out under conditions where the shaping temperature was set at a temperature at which the above material had a viscosity (glass viscosity) of $10_9$ poise ($10_8$ Pa·s), the pressing pressure was set at 180 kg/cm$^2$ and the pressing time was set for 10 seconds.

In the precision-press shaping machine 11 shown in FIG. 3, a support block 13 is disposed in one end of a support rod 12, and a shaping mold 14 constituted of an upper mold member 14a, a lower mold member 14b and a guide mold member (sleeve) 14c is disposed on the support block 13. A shapeable material (precision-press shapeable material) 15 is placed on a shaping surface of the lower mold member 14b, the upper mold member 14a is placed thereon, and then they are arranged in a quartz tube 17 having a circumferential winding of a heater 16. The above upper mold member 14a is movable, and during the precision-press shaping, a load is exerted from above the above upper mold member 14a in the perpendicular direction with a pressing rod 18. Inside the above lower mold member 14b, further, a thermocouple 19 is inserted through the support rod 12 and the support block 13, and temperatures of the shaping mold 14 are monitored by using the above thermocouple 19.

The so-obtained aspherical lens had a remarkably high form accuracy. Further, since weight variability of the above shapeable materials (precision-press shapeable materials) 15 was very small, as small as 0.45% (see Example 30), the shapeable materials 15 showed almost no volume difference relative to the cavity volume of the shaping mold 14 in the precision-press shaping, and as a result, when the aspherical lenses were mass-produced, the weight variability among the aspherical lenses was very small.

As explained above, the optical glass of the present invention is a high-refractivity high- or intermediate-dispersion optical glass which is almost free from the phenomenon of part of its glass melt wetting backward along an outer surface of end portion of a flow pipe even when the glass melt is flowed down from a small-diametered flow pipe made of Pt or a Pt alloy.

According to the present invention, therefore, small-sized optical products of a high-refractivity high-or intermediate-dispersion optical glass can be easily mass-produced.

What is claimed is:

1. A press shapeable glass preform in the form of a sphere, a marble, a flat plate, a column or a round loaf which is formed of an optical glass comprising silicon oxide, boron oxide, lithium oxide, calcium oxide, titanium oxide and niobium oxide, the total content of silicon oxide, boron oxide, lithium oxide, calcium oxide, titanium oxide and niobium oxide being at least 63% by weight, the content of the silicon oxide being 17 to 33% by weight, exclusive of 17% by weight, the content of the boron oxide being 1 to 25% by weight, the content of the lithium oxide being 5 to 11% by weight, the content of the calcium oxide being 5 to 27% by weight, exclusive of 5% by weight, the content of the titanium oxide being 1 to 20% by weight, the content of the niobium oxide being 13 to 30% by weight, exclusive of 13% by weight, the total content of the silicon oxide and the boron oxide being 20 to 50% by weight, the ratio of a content of the silicon oxide to a content of the boron oxide being greater than 0.78, the optical glass further comprising 0 to less than 16% by weight of lanthanum oxide, 0 to 12% by weight of zinc oxide, 0 to 15% by weight of barium oxide, 0 to 10% by weight of zirconium oxide, 0 to 10% by weight of strontium oxide, 0 to 6% by weight of tungsten oxide, 0 to 7% by weight of aluminum oxide, 0 to 5% by weight of sodium oxide, 0 to 5% by weight of potassium oxide, 0 to 5% by weight of yttrium oxide, 0 to 5% by weight of gadolinium oxide, 0 to 5% by weight of ytterbium oxide, 0 to 5% by weight of tantalum oxide, 0 to 2% by weight of arsenic oxide and 0 to 2% by weight of antimony oxide, wherein said press-shapeable preform has a form consistent with the form of a shaped article to be obtained by precision-press shaping.

2. The press-shapeable glass preform of claim 1, wherein the optical glass has a refractive index ($n_d$) of at least 1.7 and an Abbe number ($v_d$) of 28 to 41, the ratio of a content of the silicon oxide to a content of the boron oxide being greater than 0.78, the optical glass having a contact angle of at least 40° to Pt or a Pt alloy at a temperature higher than its liquidus temperature by 20° C., and having a sag temperature $T_s$ of 580° C. or lower.

3. The press-shapeable preform of claim 1, wherein the press-shapeable glass preform is produced by shaping a glass gob obtained by dropping a precision press-shapeable optical glass from an outlet of a flow pipe made of Pt or a Pt alloy to obtain a glass gob and shaping the glass gob to obtain the precision-press shapeable preform.

4. The press shapeable glass preform of claim 1, wherein the optical glass comprises silicon oxide, boron oxide, lithium oxide, calcium oxide, titanium oxide and niobium oxide, the content of the silicon oxide being 17.5 to 31% by weight, the content of the boron oxide being 1.5 to 22% by weight, the content of the lithium oxide being 5.3 to 9.5% by weight, the content of the calcium oxide being 5.5 to 24.5% by weight, the content of the titanium oxide being 2.5 to 18% by weight, the content of the niobium oxide being 13 to 27.5% by weight, exclusive of 13% by weight, the total content of the silicon oxide and the boron oxide being 24 to 43% by weight, the ratio of the silicon oxide content to the boron oxide content being greater than 0.80, the optical glass further comprising 0 to 15% by weight of lanthanum oxide, 0 to 11% by weight of zinc oxide, 0 to 12% by weight of barium oxide, 0 to 7% by weight of zirconium oxide, 0 to 8% by weight of strontium oxide, 0 to 4% by weight of tungsten oxide, 0 to 5% by weight of aluminum oxide, 0 to 3% by weight of sodium oxide, 0 to 3% by weight of potassium oxide, 0 to 3% by weight of yttrium oxide, 0 to 3% by weight of gadolinium oxide, 0 to 3% by weight of ytterbium oxide, 0 to 3% by weight of tantalum oxide, 0 to 2% by weight of arsenic oxide and 0 to 2% by weight of antimony oxide.

5. The press-shapeable glass preform of claim 1, wherein a weight variability is within ±2% in a preform for obtaining an optical product having a weight of 100 mg or less and within ±5% in a preform for obtaining an optical product having a weight of over 100 mg.

6. A press-shapeable preform in the shape of a sphere, a marble, a flat plate, a column or a round loaf which is produced by shaping a glass gob obtained by dropping a precision press-shapeable optical glass from an outlet of a flow pipe made of Pt or a Pt alloy to obtain a glass gob and shaping the glass gob to obtain the precision-press shapeable preform, the optical glass comprising silicon oxide, boron oxide, lithium oxide, calcium oxide, titanium oxide and niobium oxide, the total content of silicon oxide, boron oxide, lithium oxide, calcium oxide, titanium oxide and niobium oxide being at least 63% by weight, the content of the silicon oxide being 17 to 33% by weight, exclusive of 17% by weight, the content of the boron oxide being 1 to 25% by weight, the content of the lithium oxide being 5 to 11% by weight, the content of the calcium oxide being 5 to 27% by weight, exclusive of 5% by weight, the content of the titanium oxide being 1 to 20% by weight, the content of the niobium oxide being 13 to 30% by weight, exclusive of 13% by weight, the total content of the silicon oxide and the boron oxide being 20 to 50% by weight, the ratio of a content of the silicon oxide to a content of the boron oxide being greater than 0.78, the optical glass further comprising 0 to less than 16% by weight of lanthanum oxide, 0 to 12% by weight of zinc oxide, 0 to 15% by weight of barium oxide, 0 to 10% by weight of zirconium oxide, 0 to 10% by weight of strontium oxide, 0 to 6% by weight of tungsten oxide, 0 to 7% by weight of aluminum oxide, 0 to 5% by weight of sodium oxide, 0 to 5% by weight of potassium oxide, 0 to 5% by weight of yttrium oxide, 0 to 5% by weight of gadolinium oxide, 0 to 5% by weight of ytterbium oxide, 0 to 5% by weight of tantalum oxide, 0 to 2% by weight of arsenic oxide and 0 to 2% by weight of antimony oxide, wherein said press-shapeable preform has a form consistent with the form of a shaped article to be obtained by precision-press shaping.

7. The press-shapeable glass preform of claim 6 wherein the optical glass has a refractive index ($n_d$) of at least 1.7 and an Abbe number ($v_d$) of 28 to 41, the ratio of a content of the silicon oxide to a content of the boron oxide being greater than 0.78, the optical glass having a contact angle of at least 40° to Pt or a Pt alloy at a temperature higher than its liquidus temperature by 20° C., and having a sag temperature $T_s$ of 580° C. or lower, wherein said press-shapeable preform has a form consistent with the form of a shaped article to be obtained by precision-press shaping.

8. The press-shapeable glass preform of claim 6, wherein a weight variability is within ±2% in a preform for obtaining an optical product having a weight of 100 mg or less and within ±5% in a preform for obtaining an optical product having a weight of over 100 mg.

* * * * *